United States Patent [19]

Yoshida et al.

[11] Patent Number: 4,572,645

[45] Date of Patent: Feb. 25, 1986

[54] EXPOSURE CONTROL DEVICE FOR CAMERA

[75] Inventors: Yoichi Yoshida; Akihiko Hashimoto, both of Hachioji; Tatsuya Suzuki, Chofu; Hitoshi Shirai, Sagamihara; Hiroshi Akitake; Hirotsugu Nakazawa, both of Hachioji, all of Japan

[73] Assignee: Olympus Optical Co., Ltd., Tokyo, Japan

[21] Appl. No.: 670,559

[22] Filed: Nov. 13, 1984

[30] Foreign Application Priority Data

Feb. 14, 1984 [JP] Japan .................................. 59-25912

[51] Int. Cl.⁴ .............................................. G03B 7/097
[52] U.S. Cl. ..................................... 354/435; 354/439; 354/230
[58] Field of Search ............... 354/435, 436, 437, 439, 354/440, 230

[56] References Cited

U.S. PATENT DOCUMENTS

| | | | |
|---|---|---|---|
| 4,053,907 | 10/1977 | Iwata et al. | 354/437 |
| 4,354,748 | 10/1982 | Grimes et al. | 354/437 |
| 4,360,258 | 11/1982 | Hashimoto | 354/435 |
| 4,362,372 | 12/1982 | Kiesel | 354/437 |

FOREIGN PATENT DOCUMENTS

| | | | |
|---|---|---|---|
| 105805 | 3/1980 | Japan . | |
| 0027109 | 2/1983 | Japan | 354/439 |

Primary Examiner—Russell E. Adams
Attorney, Agent, or Firm—Louis Weinstein

[57] ABSTRACT

An exposure control device for camera includes a detector for detecting the opening of a sector shutter. By detecting an actual opening of the sector shutter, an amount of incremental exposure is calculated based on the opening and the corresponding time interval. Such amount is accumulated to provide an accumulated value. An amount of proper exposure is determined on the basis of photographing information including the brightness of an object being photographed and a film speed. The sector shutter is controlled in accordance with the accumulated value and the amount of proper exposure.

19 Claims, 17 Drawing Figures

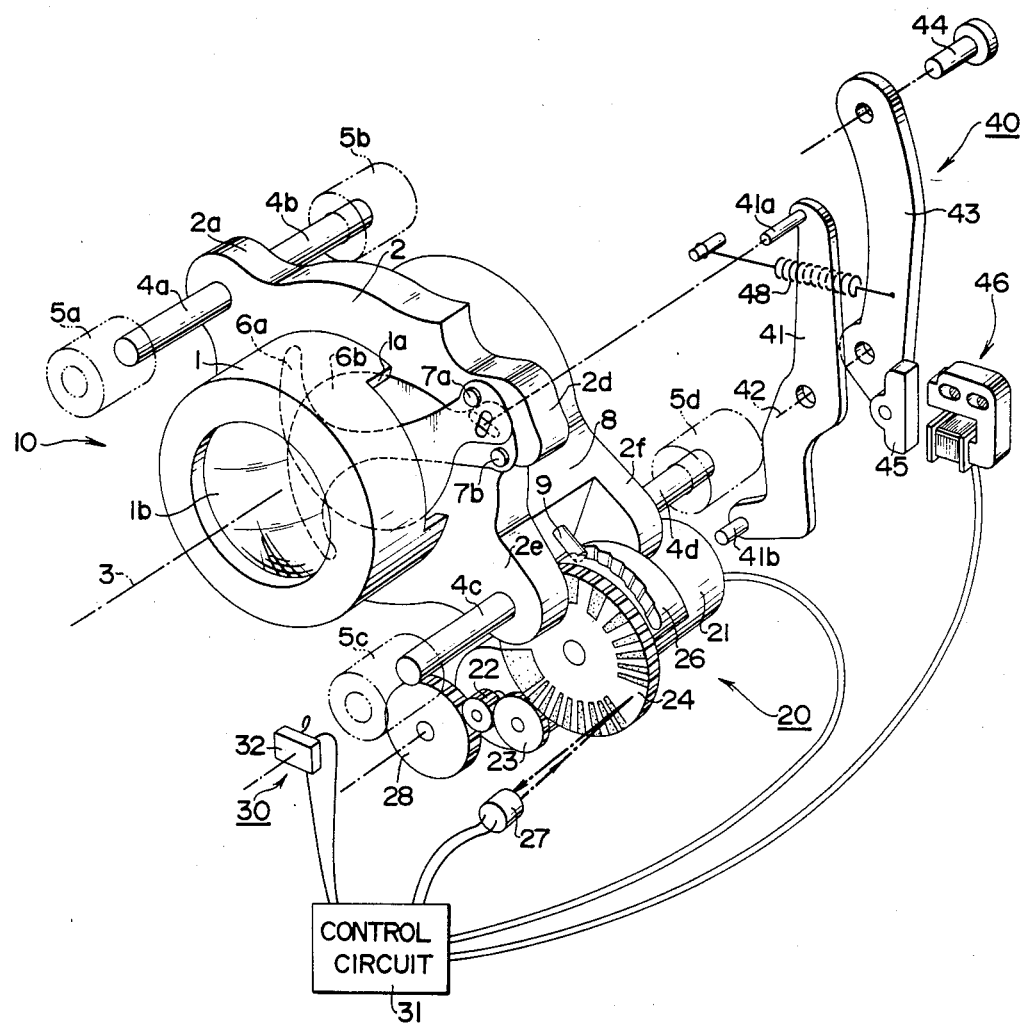
F I G. 4

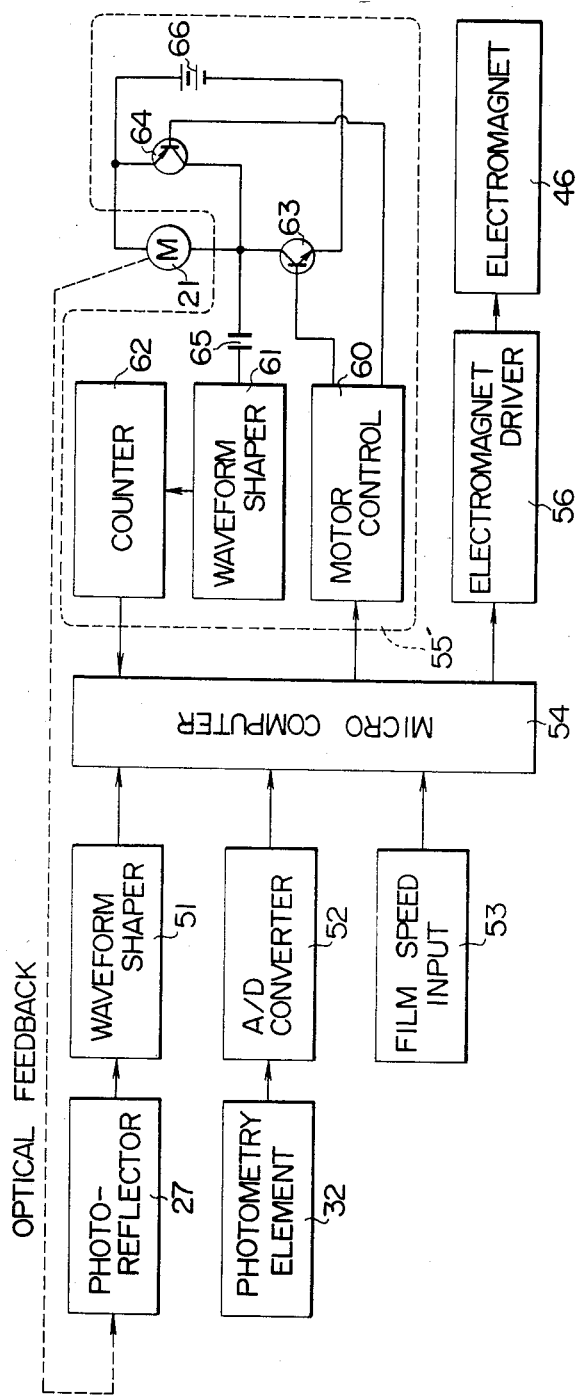

EXPOSURE CONTROL DEVICE FOR CAMERA

BACKGROUND OF THE INVENTION

The invention relates to an exposure control device for cameras having a combined diaphragm and sector shutter.

It is known that a camera which provides a programmed exposure control may utilize a so-called triangular opening scheme in which a combined diaphragm and sector shutter is opened gradually so that a triangular response of the exposure is produced with respect to time and the shutter is closed when a proper amount of exposure has been provided. With this scheme, the photometry of light from an object being photographed which changes with time is achieved through a sub-diaphragm which opens in mechanically interlocked relationship with the sector shutter. However, it is found that the opening of the sub-diaphragm is lagging with respect to the opening of the sector shutter in the camera of the type described, and there has been a need to compensate for such lagging by the provision of some means (see Japanese Laid-Open Patent Application No. 32,082/1980). Obviously, the sector shutter remains closed before a release operation takes place, thus preventing the photometry. This accompanies a disadvantage that a warning concerning low brightness cannot be given before the release operation.

SUMMARY OF THE INVENTION

In view of the foregoing, it is an object of the invention to provide a programmed exposure control device of triangular opening type which avoids the use of a sub-diaphragm.

It is another object of the invention to provide an exposure control device for a fully automatic camera in which a drive member that is used to open a shutter is used for achieving a distance adjustment, followed by controlling a combined diaphragm and shutter.

In the exposure control device for the camera of the invention, a sector shutter is controlled based on an accumulated value of exposure as calculated by an actual opening of a sector shutter combined with a time interval during which it is open and a required exposure command value which is derived from information relating to the brightness of an object being photographed, film speed and the like. In this manner, a programmed exposure control of triangular opening type is enabled while avoiding the use of a sub-diaphragm, thus eliminating the disadvantage which is experienced when such sub-diaphragm is used.

It is another feature of the invention that means which determines a proper amount of exposure utilizes a light receiving element which effects the photometry of the brightness of an object being photographed and which is also capable of giving a warning of low brightness.

It is a further feature of the invention that a shutter control is preceded by a distance adjustment. The drive for the distance adjustment is applied to a point proximate to a guide member for a movable lens barrel, thus achieving a smooth distance adjusting operation.

BRIEF DESCRIPTION OF THE DRAWINGS

FIG. 4. is an exploded perspective view of an exposure control device for a camera according to one embodiment of the invention;

FIG. 12 is a block diagram and a circuit diagram of the exposure control device shown in FIG. 11; and FIGS. 13A and 13B graphically show input and output waveforms of a waveform shaper shown in FIG. 12.

DETAILED DESCRIPTION OF PREFERRED EMBODIMENTS

Initially the principle of exposure control according to the invention will be described. Representing a diaphragm aperture by F, an exposure period by T, the brightness of an object being photographed by B and a film speed by S, a proper exposure can be obtained when the following equality applies:

$$\frac{K}{B \cdot S} = \frac{T}{F^2} \quad (1)$$

where K represents a constant.

Figure 2:
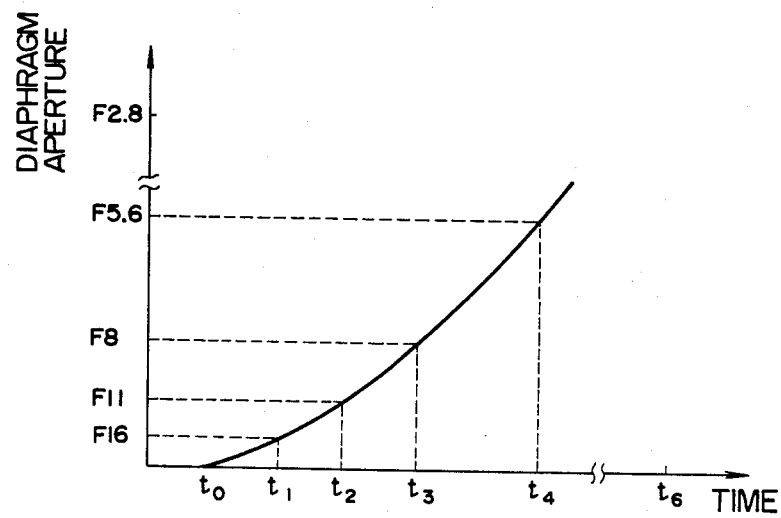
FIG. 2 graphically shows the opening characteristic of a sector shutter of a camera in which the exposure control device of the invention may be used.
Figure 3:
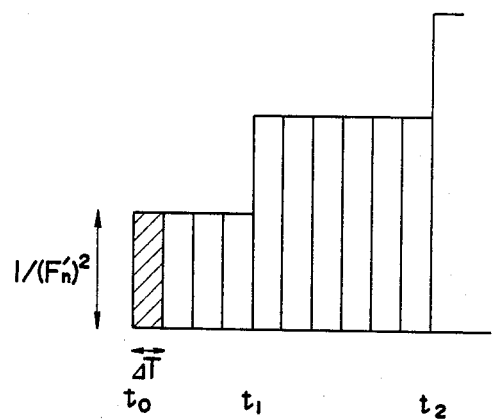
FIG. 3 is a bar graph illustrating the principle of the exposure control according to the invention.
Figure 5:
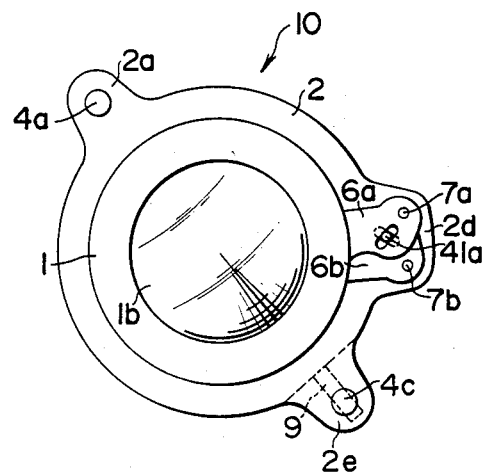
FIG. 5 is a front view of a movable lens barrel shown in FIG. 4.

FIG. 2 graphically shows a change in the diaphragm aperture of a sector shutter associated with a shutter release operation. Considering a camera having a range of diaphragm apertures from F2.8 to F16, and assuming that a shutter release takes place at time $t_0$, the sectors then begin to open and produce F16 at time $t_1$, F11 at time $t_2$, F8 at time $t_3$, F5.6 at time $t_4$, ... and F2.8 at time $t_6$. Because the opening of the sector shutter does not always occur at a uniform rate, the time intervals between the discrete values of the diaphragm aperture change. For the purpose of approximation, it may be assumed that during an incremental time interval of $\Delta T$, a diaphragm aperture changes by one step from an initial value Fn to a later value Fm and that during such interval, the diaphragm aperture remains unchanged and equal to a value F'n intermediate these values (where n=0, 16, 11, 8, 5.6, 4 and m=16, 11, 8, 5.6, 4, 2.8). Using such approximation, the exposure that is provided during the time interval $\Delta T$ may be illustrated by a hatched area in the bar graph of FIG. 3 or equal to $\Delta T/(F'n)^2$. Accordingly, at time $t_2$ since the shutter release, the total exposure can be given as follows:

$$\left\{ \frac{\Delta T}{(F'0)^2} + \frac{\Delta T}{(F'0)^2} + \ldots + \frac{\Delta T}{(F'0)^2} \right\} + \quad (2)$$

$$\left\{ \frac{\Delta T}{(F'16)^2} + \frac{\Delta T}{(F'16)^2} + \ldots + \frac{\Delta T}{(F'16)^2} \right\} \approx \int_0^{t_2} \frac{1}{F(t)^2} dt$$

where F(t) represents a diaphragm aperture at time t. As described, F'0 represents a diaphragm aperture which is intermediate between the beginning of opening of the shutter sector and F16, and F'16 represents a diaphragm aperture substantially midway between F16 and F11. Consequently, the total exposure after a time interval T is given as follows:

$$\left\{ \frac{\Delta T}{(F'0)^2} + \frac{\Delta T}{(F'0)^2} + \ldots + \frac{\Delta T}{(F'0)^2} \right\} + \quad (3)$$

$$\left\{ \frac{\Delta T}{(F'16)^2} + \frac{\Delta T}{(F'16)^2} + \ldots + \frac{\Delta T}{(F'16)^2} \right\} + \ldots +$$

$$\left\{ \frac{\Delta T}{(F'n)^2} + \frac{\Delta T}{(F'n)^2} + \ldots + \frac{\Delta T}{(F'n)^2} \right\} \approx$$

$$\int_0^T \frac{1}{F(t)^2} dt = \frac{T}{F^2}$$

Combining the equations (1) and (3), it will be seen that a proper exposure is achieved by closing the shutter when an accumulated value of discrete exposures $\Delta T/(F'n)^2$ during the individual time intervals $\Delta T$ is equal to the value of $K/B \cdot S$ which is previously calculated.

Figure 1:
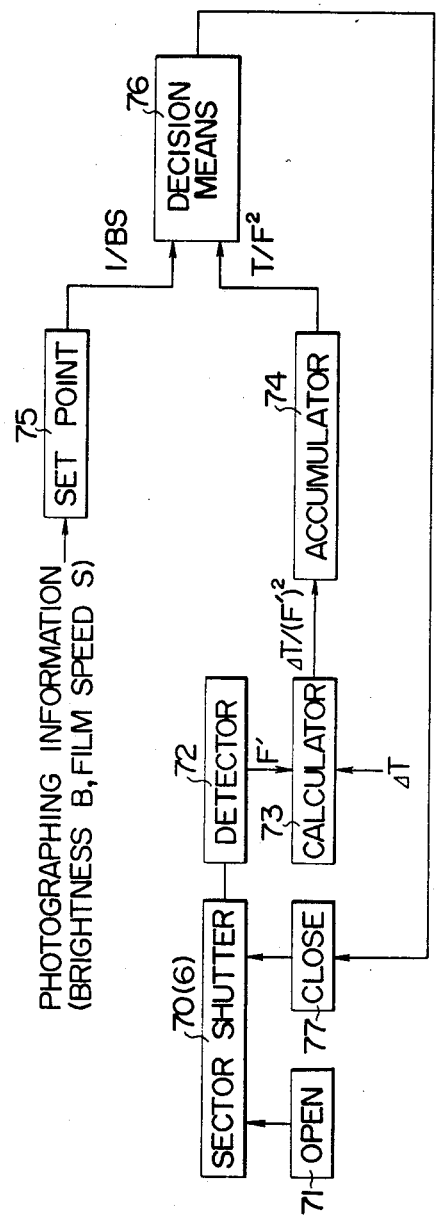
FIG. 1 is a block diagram schematically illustrating the general arrangement of the invention.

Referring to FIG. 1, an arrangement of the invention will be described. A combined diaphragm and sector shutter is schematically shown at 70 and is opened by opening means 71. The opening F' of the sector shutter 70 is detected by an opening detector 72, which delivers its output to an exposure calculator 73. In response to the opening F' and a preset incremental time interval $\Delta T$, the exposure calculator 73 delivers an output indicative of an amount of exposure $\Delta T/(F')^2$. Successive values of the incremental exposure $\Delta T/(F')^2$ are accumulated by an accumulator 74 for a time period T which begins with the release operation, thus delivering an accumulated value $T/F^2$. On the other hand, information relating to the brightness B of an object being photographed, film speed S and the like is supplied to means 75 which determines a setpoint $1/B \cdot S$ for the exposure, which is then delivered to decision means 76. The decision means 76 compares the accumulated value $T/F^2$ against the setpoint value $1/B \cdot S$, and when they satisfy a predetermined relationship which assures a proper exposure, it delivers an output to closing means 77, which closes the sector shutter 70. In the description of the principle, the setpoint $1/B \cdot S$ has been multiplied by the constant K, but such constant is omitted in FIG. 1 since the value $T/F^2$ may be multiplied by a suitable constant.

An embodiment of the invention as applied to a lens barrel of a camera will now be described with reference to FIGS. 4 to 7. A movable lens barrel 10 essentially comprises a lens frame 1 in the form of a hollow cylinder having a reduced length and holding a taking lens 1b therein, and a shutter support plate 2 which is integrally formed around the outer peripheral surface of the lens frame 1 intermediate its length and having the form of a relatively thick disc with a flange. A semi-circular extension 2a is formed on the upper, left-hand portion, as viewed in FIGS. 4 and 5, of the shutter support plate 2, and a pair of guide pins 4a, 4b are fixedly mounted on the extension and extend forwardly and rearwardly from the front and the rear surface, respectively, of the extension 2a in a direction parallel to the optical axis 3 of the lens 1b. These guide pins 4a, 4b are adapted to slide through a pair of guide sleeves 5a, 5b which are secured to a camera body so as to be parallel to the optical axis 3. A trapezoidal extension 2d extends from the upper, right-hand portion of the shutter support plate 2, and a pair of pins 7a, 7b are fixedly mounted on the front surface of the extension 2d and are spaced apart by a given distance. A pair of sectors 6a, 6b, which together form a shutter of vario type, and operating as a combined diaphragm and shutter, are pivotally mounted on these pins 7a, 7b. An elongate slot, shown but not designated, is formed in the support plate at a location slightly offset to the left from the center of a line segment joining the centers of the pins 7a, 7b so as to permit a sector opening and closing pin 41a, to be described later, to be movable in a lateral direction, as viewed in FIG. 6. The sectors 6a, 6b pass through a notch 1a, formed around the lens frame 1 on the side nearer the front side of the support plate 2, to extend into the interior of the lens frame 1 to open or close an exposure aperture 6e (see FIG. 6) which is defined in the lens frame 1.

A semi-circular extension 2e is formed on the lower, right-hand portion of the shutter support plate 2, and a guide pin 4c is fixedly mounted on the extension so as to extend forwardly from the front surface thereof in a direction parallel to the optical axis 3, the guide pin 4c being located symmetrically to the guide pine 4a with respect to the interposed optical axis 3. Located on the rear side of the extension 2e and integrally formed with the lens frame 1 is an L-shaped drive pin mounting member 8 having an extension 2f of an identical configuration with the semi-circular extension 2e and which is positioned so as to be opposite to the extension 2e. A drive pin 9 is fixedly mounted on the bottom inside of the mounting member 8 substantially at the center thereof so as to extend to the right and downwardly so that it intersects perpendicularly with the extension of the central axis of the guide pin 4c. A guide pin 4d is fixedly mounted on the outside of the extension 2f in a manner such that its central axis coincides with the extension of the central axis of the guide pin 4c. These guide pins 4c, 4d are intimately fitted into stationary guide sleeves 5c, 5d which are secured in a similar manner as the guide sleeves 5a, 5b associated with the guide pins 4a, 4b mentioned above. As a result of such construction of the movable lens barrel 10, when a drive is applied to a point proximate to the point of intersection between the central axis of the drive pin 9 and the extensions of the central axes of the guide pins 4c, 4d, the movable lens barrel 10 can be smoothly driven back and forth in a direction parallel to the optical axis 3.

The shutter support plate 2 is operatively associated with a movable lens barrel drive 20, an exposure control 30 and a shutter drive 40, the construction of which will now be specifically described.

Initially considering the movable lens barrel drive 20, it comprises a reversible drive motor 21 having an output shaft on which is fixedly mounted an output gear 22, which meshes with an intermediate gear 23 to rotate a cam drive gear 24 in the same direction as the motor 21. The front surface of the cam drive gear 24 is provided with printed patterns 24a, 24b (see FIG. 6) while the rear surface is formed with a cam drive pin 24c (see FIG. 7) which may abut against either side, as appropriate, of a lens frame driving groove cam 26, to be described later, and is also formed with a cam groove 24d (see FIG. 6) in which a cam engaging pin 41b of the shutter drive 40, to be described later, is fitted.

Figure 6:
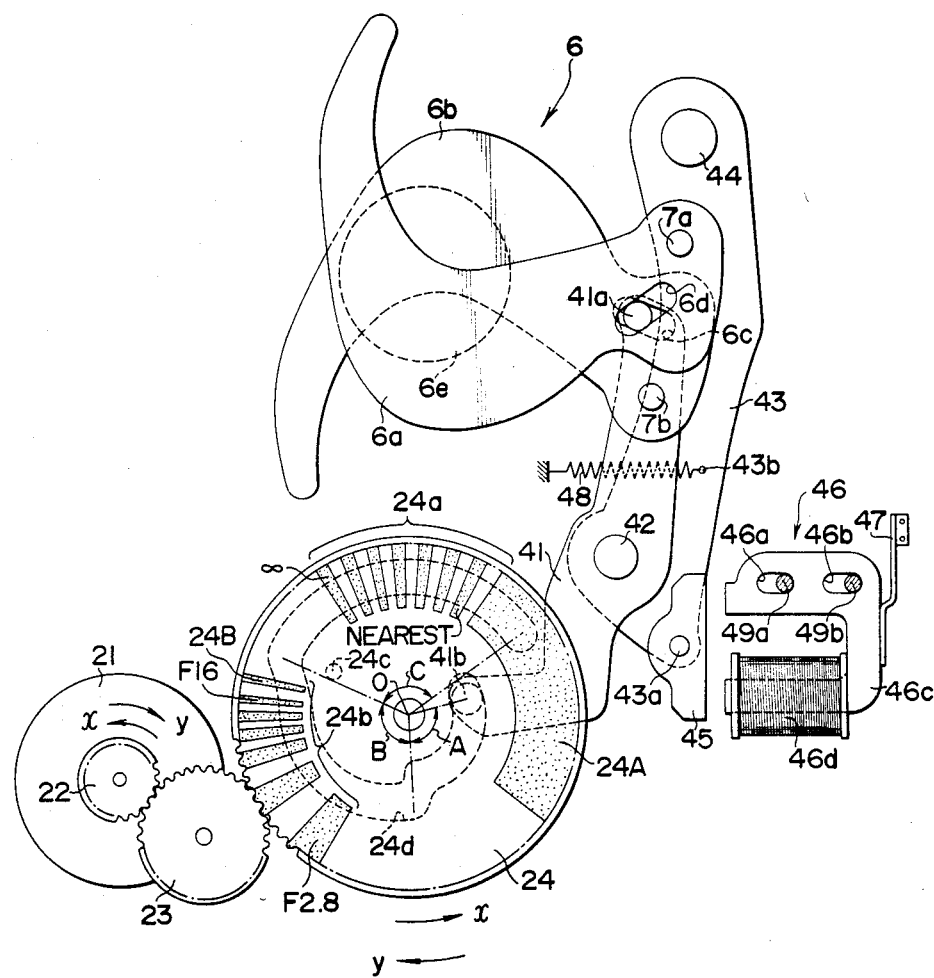
FIG. 6 is a front view, to an enlarged scale, of a diaphragm aperture detector shown in FIG. 4.

The cam groove 24d formed in the rear surface of the cam drive gear 24 is shaped to exhibit different radii referenced to the center O of the drive gear 24, as viewed on the backside thereof, in three substantially equally divided zones A, B and C, which are indicated by arrows in FIG. 6. Specifically, the cam groove 24d has a width which is slightly greater than the diameter of the cam engaging pin 41b. In the zone A, the radius remains constant and has a minimum value while in the zone C, the radius remains constant and has a maximum value. At the junction between the zones A and B, the radius increases stepwise while assuring that the pin 41b is capable of smoothly moving through the junction. Similarly, at the junction between the zones B and C, the radius again increases stepwise while assuring a smooth transition of the pin 41b. The cam groove in the zone B is formed so that its radius as referenced to the center O increases gradually from the junction between the zones A and B to the junction between the zones B and C.

The printed patterns 24a, 24b shown in FIG. 6 are formed of a material which exhibits a high reflectivity so that light produced by an emitter of a reflex type photosensor (photo-reflector) 27 (see FIG. 4), to be described later, may be reflected by either pattern 24a or 24b for incidence upon a receptor thereof. The purpose of the printed pattern 24a is to allow a receptor of the photo-reflector 27 to deliver an output signal indicative of a distance between the camera and an object being photographed as a result of a photoelectric conversion. The pattern 24a comprises a plurality of strips having a given width and circumferentially spaced apart by a given distance and extending from a radially midway point to the periphery of the drive gear 24. As viewed in FIG. 6, the left-most strip corresponds to a distance of infinity "∞" and subsequent strips sequentially correspond to a gradually decreasing distance so that a strip which is next to the right-most one corresponds to a nearest distance of 0.7 m, for example. The right-most strip 24A partly extends into the zone A.

The purpose of the printed pattern 24b is to allow the receptor of the photo-reflector 27 to deliver an output signal indicative of a diaphragm aperture when the camera is directed toward an object being photographed with its exposure controlled, as a result of photoelectric conversion. It comprises a plurality of strips having varying widths. Specifically, an uppermost strip 24B is located to the left of the zone B and has a narrow width which corresponds to the beginning of the opening, followed by a next strip which corresponds to a minimum diaphragm aperture of F16, for example. Subsequent strips, as viewed counter-clockwise, have gradually increasing widths corresponding to the sequential values of the diaphragm aperture. A right-most strip has a greatest width which corresponds to a maximum diaphragm aperture of F2.8, for example.

Figure 7:
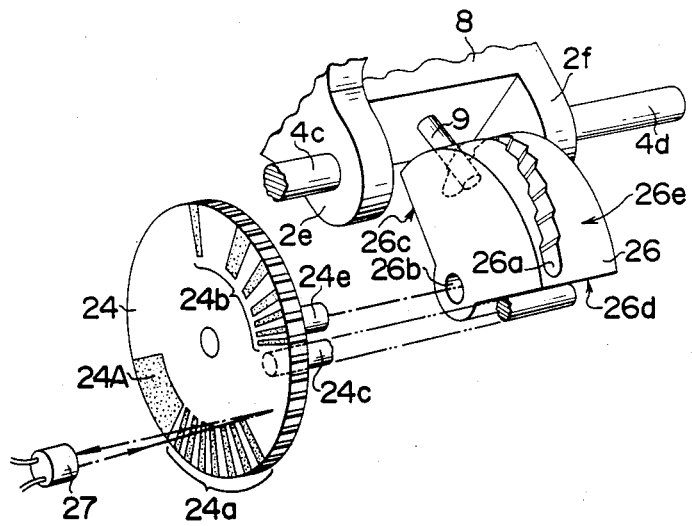
FIG. 7 is a fragmentary perspective view, to an enlarged scale, of a drive associated with the movable lens barrel shown in FIG. 4.

As shown in FIG. 6, the cam drive pin 24c fixedly mounted on the rear surface of the cam drive gear 24 is located substantially midway on a radial line joining the junction between the zones B and C and the center O of the gear 24. Referring to FIG. 7, it will be noted that the groove cam 26 which is driven by the drive pin 24c comprises a thick sector-shaped block extending over an arc of nearly 90°, when viewed in the direction of optical axis. The cam 26 has a central opening 26b which is fitted over a support shaft 24e of the cam drive gear 24 so as to be rotatable thereon. A relative rotation therebetween is permitted in this manner, and when the gear 24 rotates counter-clockwise with the pin 24c thereon pressing against the right-hand side 26d of the cam 26, the cam 26 rotates counter-clockwise about the support shaft 24e. When the gear 24 rotates clockwise with the pin 24c pressing against the left-hand side 26c of the cam 26, the cam 26 rotates clockwise about the shaft 24e. The cam 26 has a peripheral surface 26e in which a cam groove 26a is formed. The drive pin 9 fixedly mounted on the mounting member 8 is fitted into the cam groove 26a. The cam groove 26a is configured so that it defines a series of steps, each having a flat of a given width, which are successively displaced obliquely in the forward direction, beginning from a point near the rear end of the peripheral surface 26e adjacent to the left-hand side 26c and terminating at a point near the front end thereof adjacent to the right-hand side 26d. This completes the description of the movable lens barrel drive 20.

As shown in FIG. 4, the exposure control 30 comprises a photoelectric transducer element 32 which receives and determines light from an object being photographed, and an associated control circuit 31. The control circuit 31 is electrically connected to the element 32, the photo-reflector 27, the motor 21 and an electromagnet 46, to be described later, in order to control the electromagnet 46 and the motor 21 based on outputs from the element 32 and the photo-reflector 27.

Referring to FIGS. 4 and 6, the shutter drive 40 which drives the sectors 6a, 6b, serving as a combined diaphragm and shutter blade, for opening and closing movement comprises the sector opening and closing pin 41a and the cam engaging pin 41b, both fixedly mounted on a sector opening lever 41, disposed rearwardly of the cam drive gear 24, and fitted into inclined slots 6c, 6d formed in the sectors 6a, 6b, and into the cam groove 24d formed in the cam drive gear 24, respectively. It will be noted that the sector opening lever 41 has a reversed configuration to the letter "L", and has a central fulcrum which is pivotally mounted on a pin 42 that is fixedly mounted on a sector closing lever 43 adjacent to one end thereof. The lever 41 has an upwardly extending arm on which the sector opening and closing pin 41a is fixedly mounted and also has another arm extending downwardly to the left and on which the cam engaging pin 41b is fixedly mounted. The sector closing lever 43 is in the form of a generally rectilinear arm having substantially the same length as the sector opening lever 41. At its upper end, it is pivotally mounted on a pin 44 which is secured to a stationary member, and depends downwardly, carrying a bearing pivot 43a fixedly mounted on the free end thereof, the pivot 43a carrying an armature 45. The pin 42 is located upward and to the left, as viewed in FIG. 6, of the bearing pivot 43a. Intermediate its length, the sector closing lever 43 is formed with a small aperture 43b, which is engaged by one end of a coiled tension spring 48 having its other end anchored to a stationary member, thus urging the lever 43 to rotate clockwise. However, the resulting rotation of the lever 43 is normally blocked by the cam engaging pin 41b on the lever 41 which fits in the cam groove 24d in a region having the minimum radius. The armature 45 is in the form of a small piece of material having a central projection and which is centrally pivotally mounted on the lever 43 by means of the pivot 43a. Located to the right of the armature 45 is the electromagnet 46 having a U-shaped core 46c which is laterally oriented. Specifically, the upper limb of the core 46 is formed with a pair of laterally extending support slots 46a, 46b, which are fitted over support pins 49a, 49b, both secured to a stationary member, thus locating the electromagnet 46. The lower limb of the core 46c carries an operating coil 46d. A leaf spring 47 is disposed to the right of the core 46c to urge it to the left. The purpose of such arrangement is to accommodate for impacts which may be developed as the armature 45 is attracted toward the electromagnet 46.

As mentioned previously, the sector shutter 6 is formed by the pair of sectors 6a, 6b which are falciform and which serve as a combined diaphragm and shutter blade. The sectors 6a, 6b are disposed in overlapping and opposing relationship, and are pivotally mounted on the support pins 7a, 7b which are fixedly mounted on the shutter support plate 2, at their one end, as mentioned previously. Adjacent this one end, these sectors are formed with inclined slots 6c, 6d, and the sector opening and closing pin 41a passes through a common opening defined by the slots 6c, 6d. It will be seen that an exposure aperture 6e may be opened or closed as the pin 41a moves.

Figure 8:
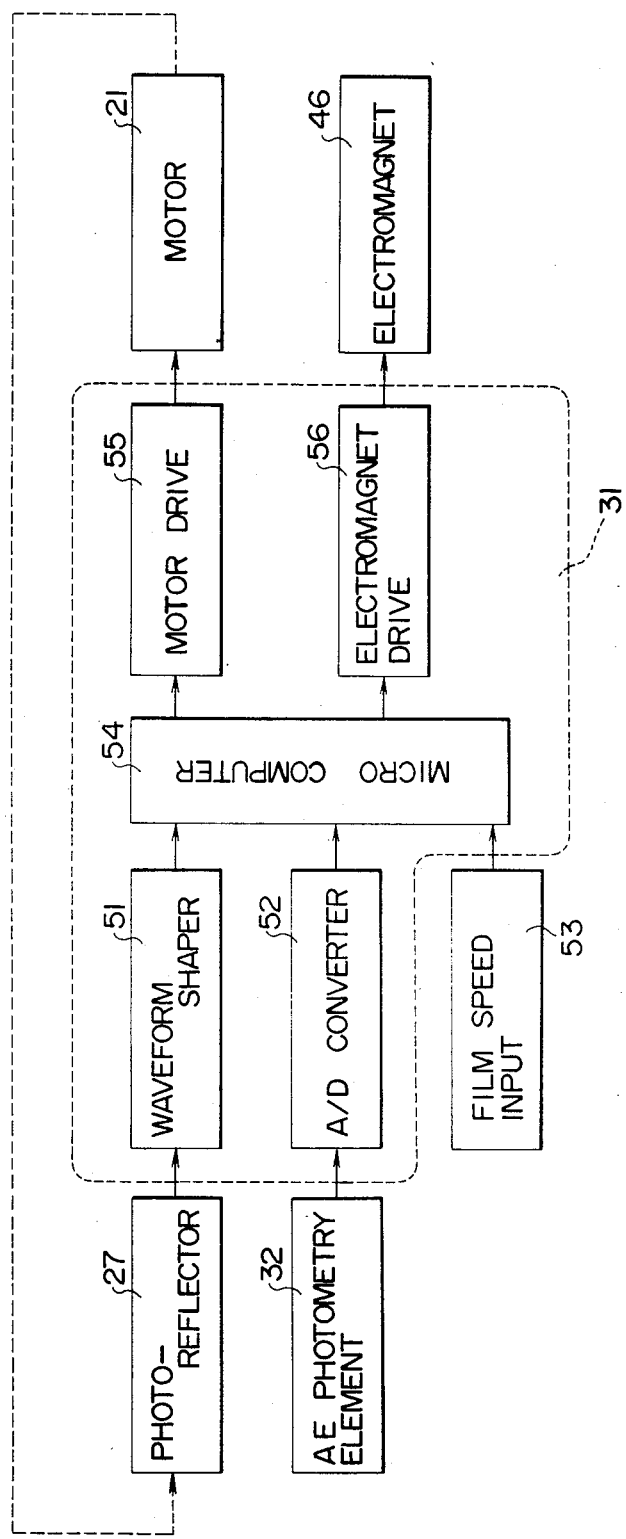
FIG. 8 is a block diagram of the exposure control device shown in FIG. 4.
Figure 9A:
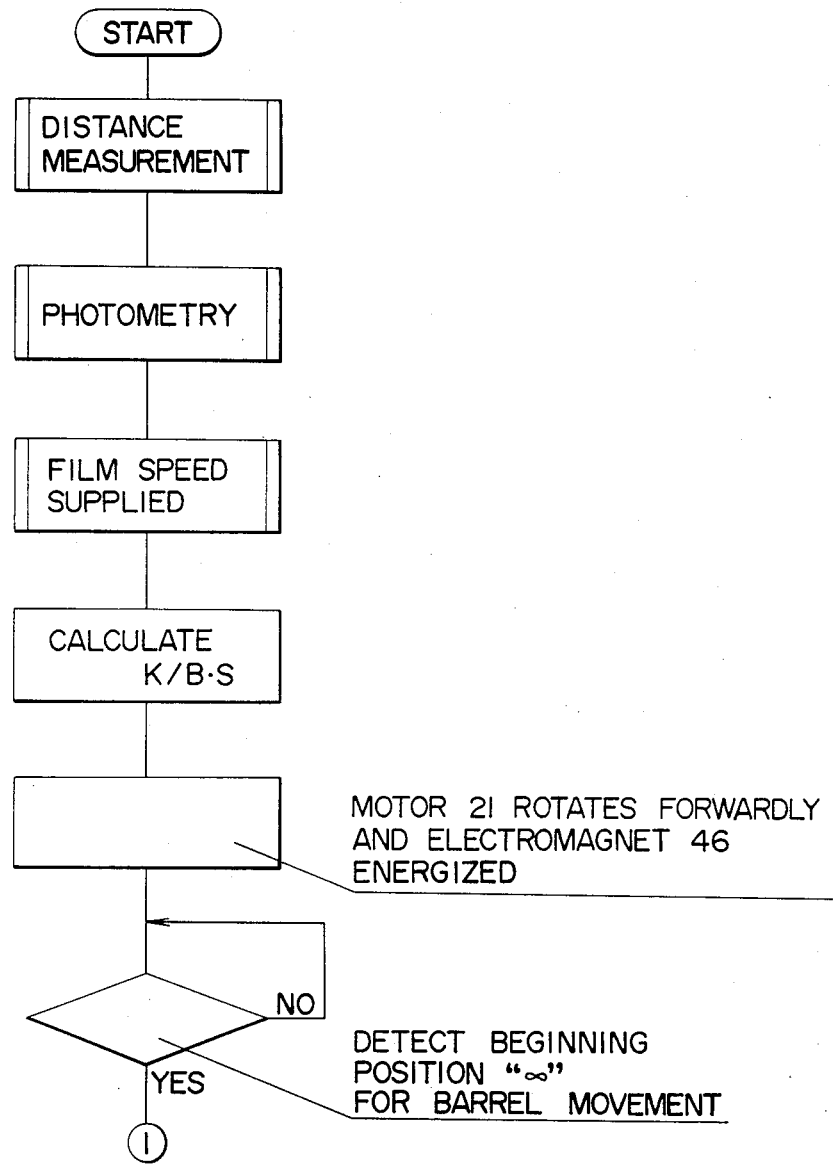
FIGS. 9A to 9D are flow charts illustrating the operating of the exposure control device shown in FIG. 4.
Figure 9B:
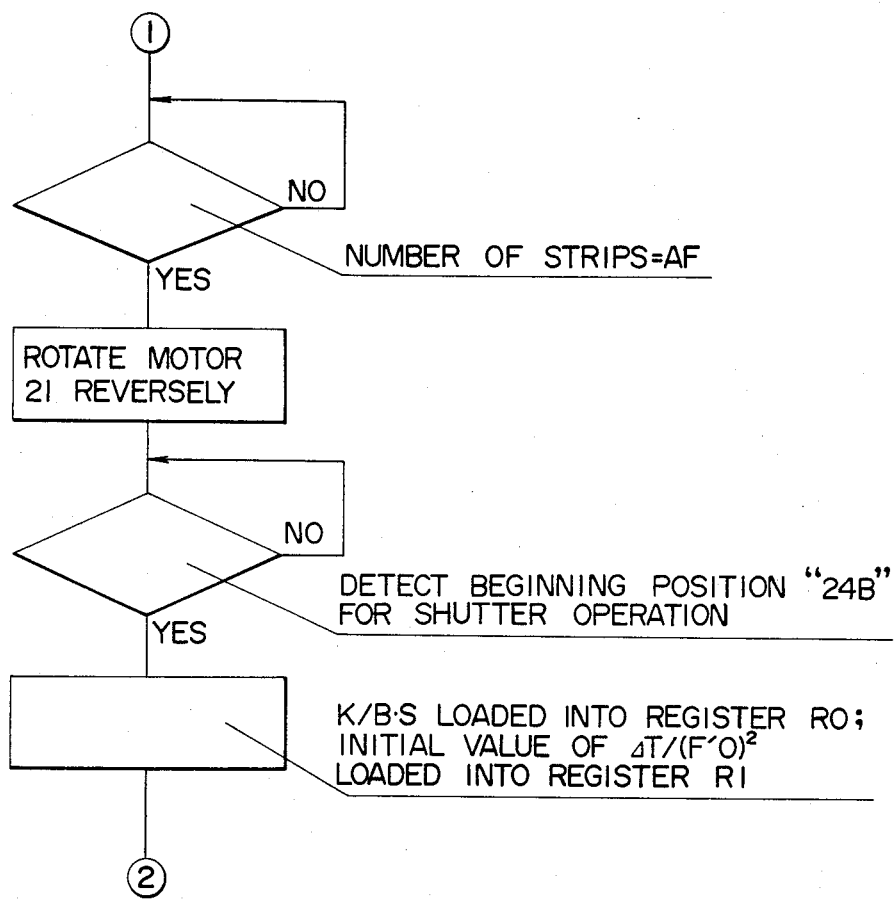
Figure 9C:
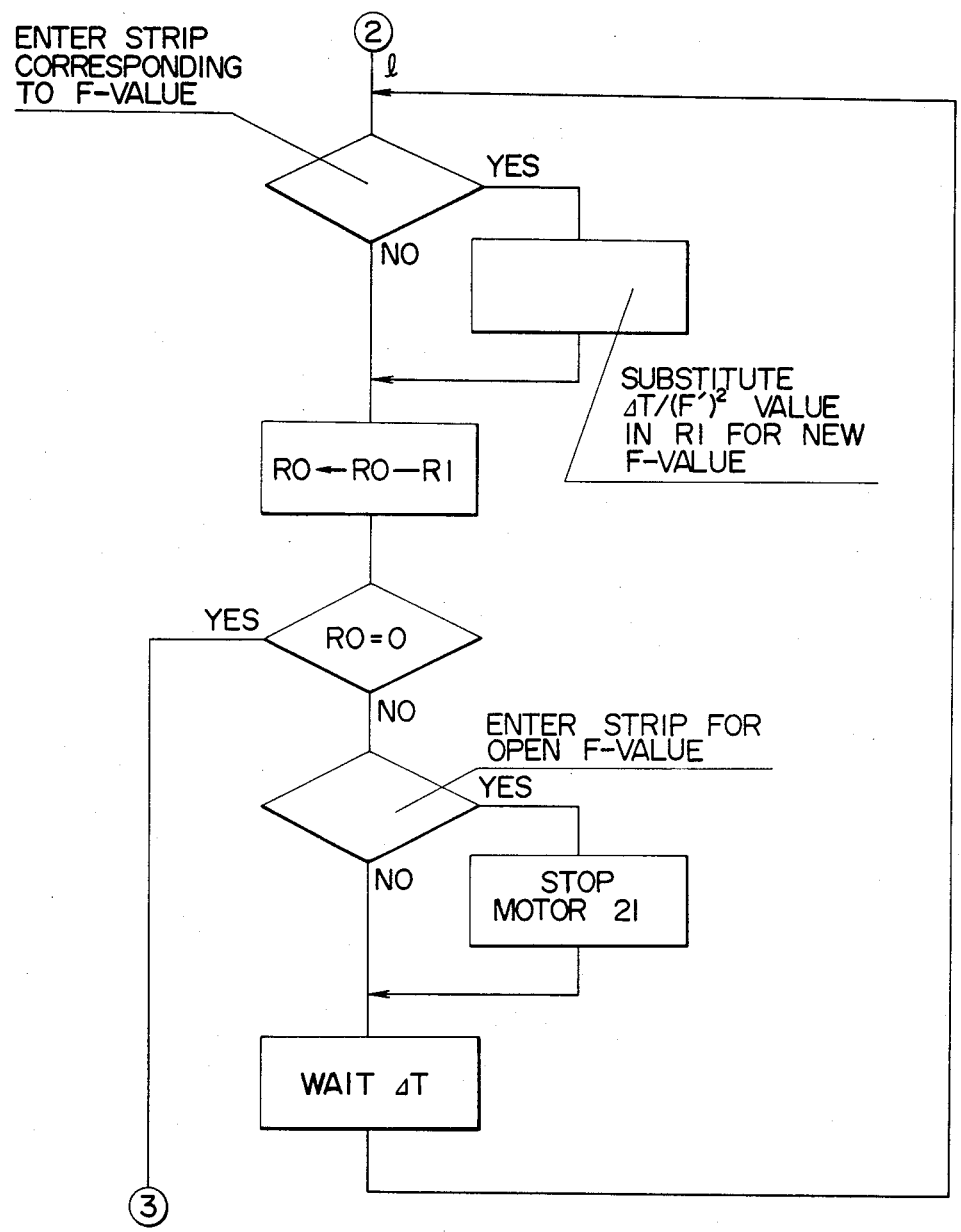
Figure 9D:
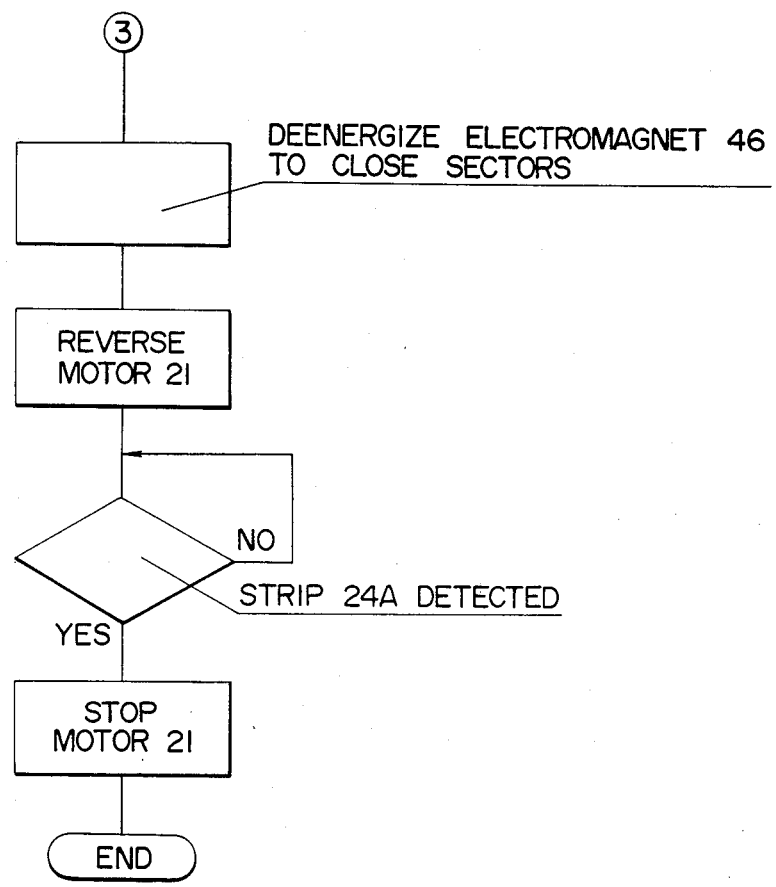

An exposure control circuit which drives the device of the invention is illustrated in FIG. 8. An output from the photo-reflector 27 which senses the printed pattern 24b, indicative of a diaphragm aperture defined by the sectors 6a, 6b, is fed to a waveform shaper 51 and thence to a microcomputer 54. The brightness of an object being photographed is derived from the photoelectric transducer element 32 as an analog output, which is converted into a corresponding digital value by an A/D converter 52 for input to the microcomputer 54. A film speed input 53 develops an electrical output representing a film speed, and its output is also fed to the microcomputer 54. Based on such input information, the microcomputer 54 operates according to a flow chart, to be described later, to control the motor 21 and the electromagnet 46. It delivers a motor control signal which is fed to a motor drive circuit 55, which in turn controls the motor 21. The microcomputer also delivers an electromagnet control signal which is fed to an electromagnet drive circuit 56, which in turn controls the electromagnet 46.

The operation of the exposure control device of the present embodiment will now be described with reference to flow charts shown in FIGS. 9A to D. Initially, a user of the camera directs his camera towards an object being photographed while maintaining a main switch, not shown, closed as by turning the power switch of the camera on or depressing a release button through its one-half stroke. A device, not shown, is initially used to measure the distance to the object being photographed, and such value is used in calculating the number of steps "AF" by which the distance adjustment should be made from the position "∞" on the printed pattern 24a, and the calculated value is stored in RAM (random access memory) within the microcomputer 54. The light receiving element 32 receives light from an object being photographed, and the film speed input 53 supplies information concerning a film speed to the microcomputer 54. Based upon these values, the microcomputer calculates and stores a proper exposure value K/B·S. It should be noted that when the exposure value K/B·S exceeds a given value or when the brightness of the object being photographed is low, known means, not shown, may be used to give a warning for low brightness.

Subsequently when a shutter release button, not shown, is depressed, both the electromagnet 46 and the motor 21 are energized. Under this condition, the armature 45 is spaced apart by a relatively long distance from the electromagnet 46, and hence the armature 45 is not attracted to the electromagnet 46 while the latter remains energized. When the motor 21 is energized, the output gear 22 thereon rotates counter-clockwise, which is hereafter referred to as a forward rotation, as indicated by an arrow x in FIG. 6. The forward rotation is transmitted through the intermediate gear 23 to cause a forward rotation of the cam drive gear 24. Depending on the location of the cam engaging pin 41b which is fitted into the cam groove 24d in one of the zones A, B or C, the forward rotation of the drive gear 24 causes the following operations:

(1) Zone A—No movement occurs since the radius remains unchanged at its minimum value. The sector opening lever 41 is not actuated.

(2) Zone B—The radius increases gradually, and the pin 41b moves counter-clockwise, whereby the lever 41 moves counter-clockwise about the fulcrum which is defined by the sector opening and closing pin 41a. The resulting movement of the pin 42 causes the sector closing lever 43 to rotate counter-clockwise about the pin 44 against the resilience of the coiled spring 48 to cause the armature 45 to be held attracted by the electromagnet 46 which is then energized.

(3) Zone C—The radius remains unchanged at its maximum value, and hence the pin 41b does not move in this zone. Accordingly, the armature 45 is maintained as it is held attracted by the electromagnet 46 in the zone B.

On the other hand, the forward rotation of the cam drive gear 24 causes a simultaneous forward rotation of the cam drive pin 24c which is fixedly mounted on the back surface of the gear 24. When the cam engaging pin 41b assumes its position in one of the zones A, B, or C, the cam drive pin 24c cooperates with the drive groove cam 26 for distance adjustment, as follows:

(4) Zone A or B—The cam 26 does not operate since a movement of the cam drive 24c in these zones does not result in abutment against the drive groove cam 26.

(5) Zone C—The cam drive pin 24c abuts against the right-hand side 26d of the groove cam 26 to drive it for counter-clockwise rotation.

When the groove cam 26 rotates counter-clockwise, the drive pin 9 is driven forward along the cam groove 26a, and accordingly the movable lens barrel 10 is also driven forward. When the photo-reflector 27 produces an output indicating that the indicium "∞" on the printed pattern 24a has come opposite to the photo-reflector 27 since the cam engaging pin 41b has entered the zone C, the number of strips in the printed pattern 24a which move past the photo-reflector 27 subsequently is counted. The resulting count is compared against the number of steps "AF" which was determined by the measurement of the distance, and the gear 24 is caused to rotate in the direction indicated by the arrow x until a coincidence is reached therebetween. Upon coincidence, the microcomputer 54 supplies a control signal to the motor drive circuit 55 to rotate the motor 21 clockwise (which is hereafter referred to as a reverse rotation). The cam drive gear 24 then rotates reversely or in a direction indicated by an arrow y (see FIG. 6), and hence the cam drive pin 24c moves in a direction away from the right-hand side 26d of the groove cam 26. Accordingly, the groove cam 26 ceases to rotate and remains at the position where it has reached, and at the same time the movable lens barrel 10 also ceases to move forwardly and remains stationary at its in-focus position. It will be appreciated that the rotation of the motor 21 cannot be reversed instantaneously when an output indicating an in-focus position is supplied. Accordingly, each step of the cam groove 26a is formed with a flat along which the drive pin 9 may travel to facilitate stopping the movable lens barrel 10 temporarily. It will be seen that the flat also accommodates for any slight error in the stop position. As a result of the movement of the movable lens barrel 10 in the forward direction, the spacing between the sector closing lever 43 and the sector shutter 6 increases, but the sector opening and closing pin 41a has a sufficient length to maintain a full engagement between the pin 41a and the slots formed in the sectors 6a, 6b if the movable lens barrel 10 is adjusted through its full stroke from a position corresponding to the range from infinity to the nearest point.

When an in-focus position is detected in this manner, the reverse rotation of the motor 21 effects an exposure process by the opening and closing of the shutter as well as a returning movement of the movable lens barrel 10 to its initial position.

As mentioned previously, the motor 21 begins its reverse rotation to cause the cam drive gear 24 to rotate reversely or in the direction indicated by the arrow y shown in FIG. 6 when the in-focus position is detected. The cam engaging pin 41b is located within the zone C in the cam groove 24d at this time, and the reverse rotation of the cam drive gear 24 causes the cam engaging pin 41b to operate as follows, by passing through the zones C, B and A of the cam groove 24d in a sequential manner:

(6) Zone C—The radius remains constant at its maximum value, and hence the pin 41b does not move. Accordingly, the armature 45 remains attracted by the electromagnet 46 and the sector opening and closing pin 41a remains stationary.

(7) Zone B—While the armature 45 carried by the sector closing lever 43 is held attracted by the energized electromagnet 46, the sector opening lever 41 rotates clockwise about the pin 42. This rotation causes the sector opening and closing pin 41a to move clockwise, whereby the sectors 6a, 6b begin their opening operation. At the same time, an exposure control is performed, as will be further described later, and the electromagnet 46 is deenergized at a time when a proper amount of exposure corresponding to the brightness of an object being photographed has been achieved. Thereupon, the armature 45 is released from the electromagnet 46, whereby the sector closing lever 43 is pulled to the left by the coiled spring 48, rotating clockwise about the pin 44. Consequently, the sector opening lever 41 rotates counter-clockwise about the cam engaging pin 41b, and accordingly the sector opening and closing pin 41a also rotates counter-clockwise, thus closing the sectors 6a, 6b. A proper exposure has been given in the meantime.

(8) Zone A—The radius remains constant at its minimum value, and hence the pins 41a, 41b do not operate, maintaining the sectors 6a, 6b closed.

On the other hand, as the cam engaging pin 41b moves through the zones C, B and A of the cam groove 24 and the cam drive pin 24c rotates clockwise, as viewed in FIG. 6, as a result of the reverse rotation of the cam drive gear 24, the drive groove cam 26 which has been driven forward or to the left as viewed in FIG. 4 and remaining stationary at its in-focus position operates also as follows:

(9) Zones C and B—The cam 26 does not move since the cam drive pin 24c does not abut against the groove cam 26.

(10) Zone A—The drive pin 24c abuts against the left-hand side 26c of the groove cam 26, which is therefore driven to rotate clockwise. Consequently, the drive pin 9 which is fitted in the groove cam 26a is driven rearwardly, simultaneously driving the movable lens barrel 10 backward until its initial position is reached.

The exposure control will now be described. The motor 21 begins its reverse rotation in the direction of the arrow y when the in-focus position is detected, thus causing the drive gear 24 to initiate its reverse rotation (see FIG. 6). Since the commencement of the reverse rotation, when the photo-reflector 27 detects the strip 24B on the printed pattern 24b which immediately precedes the minimum aperture strip F16 and which indicates the position where a shutter operation is to be initiated, an output from the photo-reflector is fed to the microcomputer 54, allowing the proper exposure value K/B·S to be loaded into a register R0 which is contained within the microcomputer 54 while an initial value of $\Delta T/(F'0)^2$ is loaded into another register R1. The photo-reflector 27 sequentially detects successive strips on the printed pattern 24b from one corresponding to F16 to one corresponding to F2.8 as the drive gear 24 rotates reversely, and each time a strip is detected, it causes a value of $\Delta T/(F'n)^2$ to be transferred to the register R1 from ROM. Specifically, different values of $\Delta T/(F'16)^2$, $\Delta T/(F'11)^2$ . . . are previously stored in the ROM, and each time the photo-reflector 27 recognizes successive strips on the printed pattern 24b corresponding to F16, F11, . . . , a corresponding value is transferred to the register R1. In the absence of a detection signal, the value in the register R1 is not updated when proceeding to the next step.

The value $\Delta T/(F'n)^2$ in the register R1 is now subtracted from the exposure value K/B·S in the register R0. The register R1 initially stores $\Delta T/(F'0)^2$, and hence this value is subtracted from the exposure value K/B·S. The result of the subtraction is transferred to the register R0, updating it. When the result of subtraction is not equal to zero, this means that a proper exposure is not reached. It is then determined if the open diaphragm aperture is reached, and if not, the program returns to a point l after a waiting time of $\Delta T$. It is to be understood that the calculating time required for the microcomputer 54 is not considered in this description. Subsequently, successive values of $T/(F'n)^2$ are transferred to the register R1 as the drive gear 24 rotates, and the subtraction mentioned above is performed for each of such values, thus updating the value stored in the register R0 to a successively smaller value. When the open diaphragm aperture is supplied, the microcomputer delivers a signal which stops the motor 21 and the program repeatedly returns to the point 1 until R0=0 is reached. The repetition of the loop returning to the point 1 is equivalent to repeating a subtracting process and accumulating the exposure values $\Delta T/(F')^2$. When the content of the register R0 becomes equal to zero as a result of such repetition, this means that the accumulated value $T/F^2$ which represents an accumulation of values $\Delta T/(F')^2$ is equal to the exposure value $K/B\cdot S$. Having obtained the proper exposure, the program then proceeds to the next step 3. In this step, the microcomputer 54 initially delivers an off signal to the electromagnet drive circuit 56, deenergizing the electromagnet 46. This allows the sector shutter 6 to be closed in a manner mentioned previously. If the sector shutter 6 remains in its open position and the motor 21 is at rest at this time, the motor 21 is again energized for reverse rotation. If the proper exposure is attained before the open position is reached, the motor 21 is allowed to continue its rotation in the direction of the arrow y without stopping. When the photo-reflector 27 detects the strip 24A, the rotation of the motor 21 is stopped and the operation according to the flow chart is completed.

Figure 10:
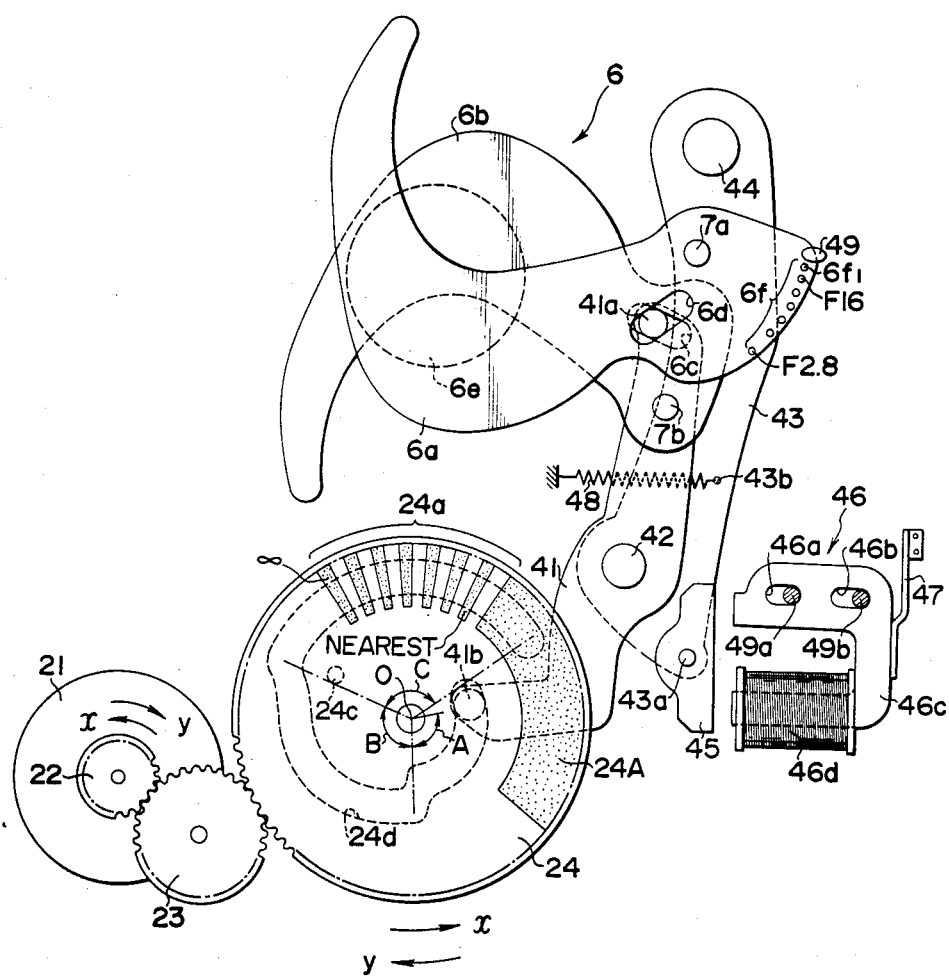
FIG. 10 is a front view of an exposure control device for a camera according to another embodiment of the invention.

FIG. 10 shows another embodiment of the invention. In the previous embodiment, a diaphragm aperture value F of the sector shutter 6 has been detected by a combination of the printed pattern 24b and a photo-reflector 27, but the diaphragm aperture is detected in this embodiment by a combination of apertures 6f and a photo-coupler 49. In other respects, the arrangement is similar to that of the previous embodiment and therefore will not be specifically described. The end of the sector 6a of the shutter 6 where it is pivotally mounted has a greater width than the corresponding end of the sector 6b, and is formed with a plurality of apertures 6f adjacent the peripheral edge thereof and at an equal distance from a support pin 6a. A photo-coupler 49 is fixedly mounted on the shutter support plate 2 so as to hold the sector 6a sandwiched therebetween along a path of movement of the apertures 6f. The photo-coupler 49 includes a light emitter located on the backside of the sector 6a and a light receptor located on its front side, and delivers an output which is waveform shaped before being supplied to the microcomputer 54. One of the apertures 6f, 6f₁, which is located at one end of the sequence of apertures 6f, functions in a manner similar to the strip 24B on the printed pattern 24b of the previous embodiment and corresponds to the beginning of opening of the shutter 6. Other apertures than the aperture 6f₁ are located in a manner corresponding to the aperture values of F16, F11, . . . F4, and F2.8 of the sector shutter 6, and also function in a manner similar to the strips in the printed pattern 24b.

As the sector shutter 6 begins to open, the sequence of apertures 6f move angularly, and such angular movement is detected by the photo-coupler 49 which determines an actual diaphragm aperture. The aperture value detected may be used in the same manner as mentioned above in connection with the previous embodiment for providing an exposure control.

Figure 11:
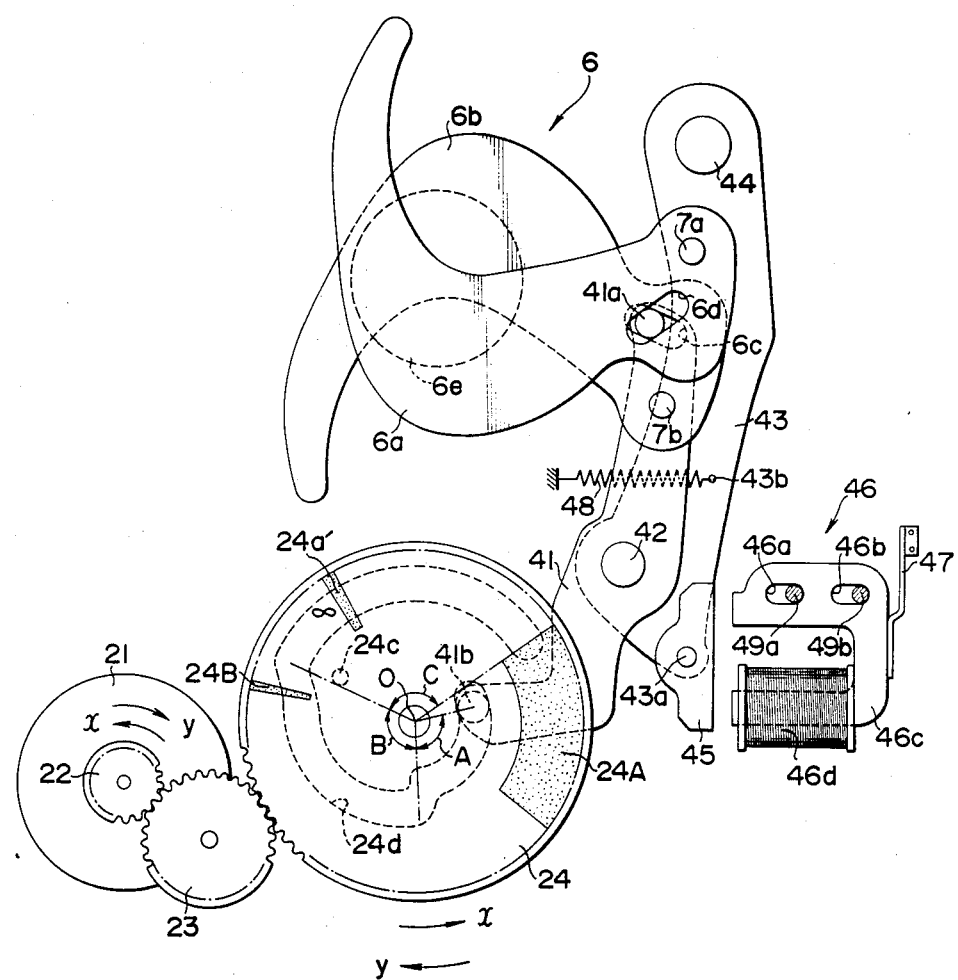
FIG. 11 is a front view of an exposure control device for a camera according to a further embodiment of the invention.

A further embodiment of the invention is illustrated in FIGS. 11 to 13. Instead of utilizing the combination of the printed pattern 24b and the photo-reflector 27 to detect the diaphragm aperture F of the sector shutter 6 as in the first mentioned embodiment, the diaphragm aperture F is detected in this embodiment by counting commutation noises of the motor 21. The arrangement other than printed patterns 24a, 24b and a motor drive circuit 55' remains the same as mentioned before, and therefore will not be described.

A printed pattern formed on the drive gear 24 comprises only a strip 24a' located at a position corresponding to "∞" and representing the position where a forward movement of the lens barrel is to be initiated during a focussing operation, a strip 24B representing the beginning of opening of the sector shutter 6 and a strip 24A representing the end of rotation of the motor 21. These strips are detected by the photo-reflector 27, which delivers its output as an input to the microcomputer 54 after waveform shaping. A microcomputer 54 delivers a motor control signal which is fed to a motor control circuit 60 shown in FIG. 12. The motor control circuit 60 has a first output which is connected to the base of an NPN transistor 63, the collector of which is connected through the motor 21 to the positive terminal of a power supply 66 and the emitter of which is connected to the negative terminal of the power supply 66. A PNP transistor 64 has its collector and emitter connected across the motor 21 so as to short-circuit it. The base of the transistor 64 is connected to a second output of the motor control circuit 60. The junction between the motor 21 and the collector of the transistor 63 is connected through a capacitor 65 to a waveform shaper 61. An output from the waveform shaper 61 is fed to a counter 62, which delivers a count output to the microcomputer 54.

In operation, instead of detecting the forward movement of the lens barrel 1 and the diaphragm aperture of the sector shutter 6 by utilizing the combination of the printed patterns 24a, 24b and the photo-reflector 27, the forward movement and the diaphragm aperture can be detected by sensing the amount of rotation of the motor 21. Specifically, when the motor control circuit 60 delivers a high level signal to the base of the transistor 64, the latter is turned on, energizing the motor 21 for rotation. As the motor 21 rotates, noises are produced by the computer of the motor 21, as graphically shown in FIG. 13A, which noises pass through the capacitor 65 to be inputted to the waveform shaper 61. The shaper 61 shapes the waveform of such commutation noises into pulses as illustrated in FIG. 13B. The resulting pulses are counted by the counter 62. When the count in the counter 62 reaches a value which corresponds to a selected strip in the printed patterns 24a, 24b, the microcomputer 54 recognizes that the lens barrel has been fed forward by one increment or that the diaphragm aperture has been decreased by one step.

In this embodiment, the beginning of the forward movement of the lens barrel 10, the beginning of opening of the sector shutter 6 and the completion of a photographing operation are detected by the photo-reflector. However, alternatively, there may be provided a switch which is responsive to the beginning of the forward movement of the lens barrel 10, the beginning of opening of the sector shutter 6 or the completion of a photographing operation.

What is claimed is:

1. An exposure control device for a camera comprising:
   means for determining a required amount of exposure based on photographing information including the brightness of an object being photographed and a film speed;
   means for opening a combined diaphragm and sector shutter in response to a release operation;

detector means for detecting an instantaneous position of part of the sector shutter or of a member which is mechanically interlocked therewith to derive a value corresponding to the magnitude of the sector opening;

calculating means responsive to an output from the detector means for calculating an amount of incremental exposure at a given time interval, the amount of incremental exposure being determined on the basis of a predetermined diaphragm aperture and the length of the time interval;

accumulating means interlocked with the opening movement of the sector shutter for accumulating amounts of incremental exposure which are outputted from the calculating means;

decision means for comparing the accumulated value from the accumulating means against the required amount of exposure determined by the first mentioned means and for delivering an output whenever a coincidence is reached therebetween; and shutter closing means responsive to an output from the decision means by closing the sector shutter.

2. An exposure control device according to claim 1 in which said means for determining a required amount of exposure comprises a photoelectric transducer element for determining the brightness of an object being photographed, an A/D converter for converting an output from the photoelectric transducer element into a corresponding digital value, means for entering a digital value which corresponds to a film speed, and a microcomputer receiving an output from the converter indicating the brightness of an object being photographed and an output from said entering means indicating a film speed and calculating a proper amount of exposure.

3. An exposure control device according to claim 2 in which an output from said means for determining a required amount of exposure is proportional to the reciprocal of the product of the brightness of an object being photographed and the film speed.

4. An exposure control device according to claim 1 in which said means for opening the sector shutter comprises a cam groove formed in a cam drive member which is driven for rotation by a motor, a shutter opening lever having its one end engaged with the cam groove and having its other end connected to a drive associated with the sector shutter, and opening lever displace means for mounting a pivot of the shutter opening lever at a point which causes the sector shutter to be opened, in mechanically interlocked relationship with the rotation of the shutter opening lever.

5. An exposure control device according to claim 4 in which the opening lever displace means comprises an electromagnet which is arranged to attract an armature connected to the pivot of the shutter opening lever.

6. An exposure control device according to claim 1 in which the detector means comprises a cam driver member adapted to be driven for rotation by a motor for determining a sector opening, a pattern formed on the cam drive member and including a plurality of strips of high reflectivity corresponding to different values of a diaphragm aperture, and a reflex type photo-sensor disposed for detecting the pattern as the cam drive member rotates to thereby determine the angular position of the cam drive member.

7. An exposure control device according to claim 1 in which the detector means comprises a plurality of apertures formed in a portion of the sector shutter which is adapted to be displaced as the sector shutter is opened and closed, and a photo-coupler for detecting successive ones of the apertures in accordance with the opening of the sector shutter.

8. An exposure control device according to claim 1 in which the detector means comprises a counter which counts commutation noises developed by a motor of the opening means as the motor rotates.

9. An exposure control device according to claim 1 in which the calculating means comprises a microcomputer which is arranged to calculate a value representing a predetermined time interval divided by the sector opening raised to the second power.

10. An exposure control device according to claim 1 in which the accumulating means comprises a microcomputer which accumulates amounts of incremental exposure as calculated by the calculating means for each predetermined time interval, thereby deriving a total amount of exposure.

11. An exposure control device according to claim 1 in which the decision means comprises a microcomputer.

12. An exposure control device according to claim 1 in which the shutter closing means comprises a shutter closing lever which has its free and connected to the pivot of the shutter opening lever and normally urged for rotation to preset the pivot at a position where the sector shutter is closed whenever a lever displace means which brings the pivot to a position where the sector shutter is opened is inoperative.

13. An exposure control device for camera comprising:

means for determining a required amount of exposure on the basis of photographing information including the brightness of an object being photographed and a film speed;

opening means for opening a combined diaphragm and sector shutter in response to a release operation;

detector means for detecting an instantaneous position of a portion of the sector shutter or a member which is mechanically interlocked therewith during its movement to derive an output having a corresponding value indicating the sector opening;

calculating means responsive to an output from the detector means for calculating an amount of incremental exposure at a predetermined time interval, the amount of incremental exposure being calculated on the basis of a predetermined diaphragm aperture and the time interval;

accumulating means mechanically associated with the opening movement of the sector shutter for accumulating successive amounts of incremental exposure from the calculating means;

decision means for comparing an accumulated value from the accumulating means against the required amount of exposure determined by the first mentioned means and for delivering an output when a coincidence is reached therebetween;

shutter closing means responsive to an output from the decision means by closing the sector shutter;

a guide member for supporting a movable lens barrel which carries the sector shutter and a taking lens so as to be reciprocable in a direction of the optical axis of the lens;

a drive interconnect member formed integrally with the movable lens barrel in alignment with the axis of the guide member or in proximity thereto; and distance adjusting means connected to the movable lens barrel through the drive interconnect member and adapted to be driven by a motor which is used in common with the opening means.

14. An exposure control device according to claim 13 in which the distance adjusting means comprises a groove cam disposed in engagement with the drive interconnect member for reciprocably displacing the movable lens barrel through the drive interconnect member as it rotates, a cam drive member driven for rotation by a motor for rotating the groove cam as it rotates, a pattern formed on the cam drive member and including a plurality of strips of high reflectivity material which correspond to different distances, a reflex type photo-sensor disposed to detect successive strips in the pattern as the cam drive member rotates, thereby sensing the angular position of the cam drive member, and in-focus decision means for determining an in-focus position in response to an output from the reflex type photo-sensor and delivering a command to stop the rotation of the groove cam as such decision is rendered.

15. An exposure control device according to claim 14 in which the cam drive member is used in common with a cam drive member for the opening means which is driven for rotation by a motor and in which the reflex type photo-sensor is used in common with the photo-sensor used for the opening detector means.

16. An exposure control device according to claim 15 in which the cam drive member is adapted to be driven for rotation in the forward and the reverse direction, the cam drive member operating the distance adjusting means during its forward rotation and operating the opening means during its reverse rotation.

17. An exposure control device according to claim 14 in which the in-focus decision means comprises a microcomputer which is used as the decision means.

18. An exposure control device according to claim 13 in which the distance adjusting means comprises a groove cam disposed in engagement with the drive interconnect member for driving the movable lens barrel either forwardly or reversely through the drive interconnect member as it rotates, a cam drive member driven for rotation by a motor to cause the groove cam to rotate as it rotates, a counter for counting commutation noises developed by the motor as it rotates, and in-focus decision means for determining an in-focus position in response to an output from the counter and delivering a command to stop the rotation of the groove cam when such decision is rendered.

19. A method for operating a camera having a combined diaphragm/shutter means and a lens focusing means, comprising the steps of;
   determining the brightness of the object being photographed;
   forming the product of the brightness value with the film speed of the film being used to photograph the object;
   moving the shutter from the closed position toward an open position;
   detecting movement of the shutter at predetermined incremental locations each identified by a location mark as each mark moves past a predetermined location;
   subtracting a value representing an incremental time interval divided by a lens opening value from the aforementioned product value each time a mark is detected;
   instantaneously closing the shutter when the resulting value of the subtraction equals zero.

* * * * *

UNITED STATES PATENT AND TRADEMARK OFFICE
CERTIFICATE OF CORRECTION

PATENT NO. : 4,572,645
DATED : February 25, 1986
INVENTOR(S) : YOICHI YOSHIDA, ET AL It is certified that error appears in the above-identified patent and that said Letters Patent is hereby corrected as shown below:

Column 3, lines 1 to 8, change the first equation $$"\left\{\frac{\Delta T}{(F0)^2} + \frac{\Delta T}{(F0)^2} + \ldots + \frac{\Delta T}{(F0)^2}\right\} +$$

$$\left\{\frac{\Delta T}{(F16)^2} + \frac{\Delta T}{(F16)^2} + \ldots + \frac{\Delta T}{(F16)^2}\right\} = \begin{array}{c} t_2 \\ 0 \end{array} \frac{1}{F(t)^2} dt \;"$$

to $$--\left\{\frac{\Delta T}{(F'0)^2} + \frac{\Delta T}{(F'0)^2} + \ldots + \frac{\Delta T}{(F'0)^2}\right\} +$$

$$\left\{\frac{\Delta T}{(F'16)^2} + \frac{\Delta T}{(F'16)^2} + \ldots + \frac{\Delta T}{(F'16)^2}\right\} \doteq \int_0^{t_2} \frac{1}{F(t)^2} dt \;--$$

UNITED STATES PATENT AND TRADEMARK OFFICE
CERTIFICATE OF CORRECTION

PATENT NO. : 4,572,645

DATED : February 25, 1986

INVENTOR(S) : YOICHI YOSHIDA, ET AL

It is certified that error appears in the above-identified patent and that said Letters Patent is hereby corrected as shown below:

Column 3, lines 17 to 29, change the second equation $$"\left\{\frac{\Delta T}{(F0)^2} + \frac{\Delta T}{(F0)^2} + \ldots + \frac{\Delta T}{(F0)^2}\right\} + \left\{\frac{\Delta T}{(F16)^2} + \frac{\Delta T}{(F16)^2} + \ldots + \frac{\Delta T}{(F16)^2}\right\} + \ldots + \left\{\frac{\Delta T}{(Fn)^2} + \frac{\Delta T}{(Fn)^2} + \ldots + \frac{\Delta T}{(Fn)^2}\right\} = \int_0^T \frac{1}{(Ft)^2} dt = \frac{T}{F^2} \;"$$

to $$--\left\{\frac{\Delta T}{(F'0)^2} + \frac{\Delta T}{(F'0)^2} + \ldots + \frac{\Delta T}{(F'0)^2}\right\} + \left\{\frac{\Delta T}{(F'16)^2} + \frac{\Delta T}{(F'16)^2} + \ldots + \frac{\Delta T}{(F'16)^2}\right\} + \ldots + \left\{\frac{\Delta T}{(F'n)^2} + \frac{\Delta T}{(F'n)^2} + \ldots + \frac{\Delta T}{(F'n)^2}\right\} \doteq \int_0^T \frac{1}{F(t)^2} dt = \frac{T}{F^2} \;--$$

UNITED STATES PATENT AND TRADEMARK OFFICE
CERTIFICATE OF CORRECTION

PATENT NO. : 4,572,645
DATED : February 25, 1986
INVENTOR(S) : YOICHI YOSHIDA, ET AL It is certified that error appears in the above-identified patent and that said Letters Patent is hereby corrected as shown below:

Column 10, line 60, change "1" to --$\ell$--;

Column 11, line 2, change "1" to --$\ell$--; and

Column 11, line 4, change "1" to --$\ell$--.

Signed and Sealed this

Seventh Day of October, 1986

[SEAL]

*Attest:*

DONALD J. QUIGG

*Attesting Officer*  *Commissioner of Patents and Trademarks*